Aug. 24, 1943.　　　A. W. BULL　　　2,327,762
METHOD OF FORMING DIES AND THE LIKE
Filed Oct. 28, 1939　　　2 Sheets-Sheet 1

INVENTOR.
ARTHUR W. BULL
BY
ATTORNEYS.

Aug. 24, 1943.  A. W. BULL  2,327,762
METHOD OF FORMING DIES AND THE LIKE
Filed Oct. 28, 1939  2 Sheets-Sheet 2

INVENTOR.
ARTHUR W. BULL
BY
ATTORNEYS

Patented Aug. 24, 1943

2,327,762

UNITED STATES PATENT OFFICE 2,327,762

METHOD OF FORMING DIES AND THE LIKE

Arthur W. Bull, Grosse Pointe, Mich., assignor to United States Rubber Company, New York, N. Y., a corporation of New Jersey Application October 28, 1939, Serial No. 301,707

6 Claims. (Cl. 204—6)

This invention relates to a method for forming molds and dies for use in making shaped molded articles and stampings. More particularly, the invention relates to a method for forming a pair of complementary mold sections, complementary dies or a punch and die combination by an electrodeposition process.

In making complementary dies, mold sections, or the like for forming molded articles or stampings, it is necessary that one of the dies or mold sections have larger general dimensions than the other die or mold section and that these complementary members have their opposed complementary faces or surfaces correctly and accurately spaced relative to each other. This relative spacing at any particular location on the complementary members is directly dependent upon the thickness of that portion of the article to be formed at such location. In cases where the finished stamped or molded articles are to have uniform thin wall portions, exactly shaped curved portions, or intricately designed portions it is highly essential that this spacing be accurately made and maintained.

In the manufacture of mold sections and dies of the above mentioned character by conventional methods, much difficulty has been encountered and a great deal of manual skill has been required in accurately forming one of the mold or die members after the other has been formed. Such work was slow and tedious and required expensive machining and engraving processes. Consequently, such methods have not proved satisfactory. This has been particularly so where it is desirous to produce a large number of complementary mold and die members of a duplicate design and construction. My invention, however, has substantially eliminated the above and other objectionable conditions by producing a very simple but efficient method for forming complementary molds, dies and the like.

In the practice of my invention it is merely necessary to provide a pattern having the configuration intended for duplication in the molded articles or stampings. On this pattern an electroformed layer of metal is deposited and then this layer or shell is removed from the pattern. Next an intermediate layer of material is formed upon the pattern face of the first layer, and upon this intermediate layer an electroformed layer of metal is deposited. The three layers are thereafter separated and the intermediate layer is removed. Thus, complementary mold or die members are formed by the first and third layers which accurately reproduce the exact configuration and dimensions of the intermediate layer and that desired in the molded or stamped article to be subsequently formed by the first and third layers.

When the molds or dies are intended for forming stampings, the intermediate layer may be of metal and electrodeposited upon the first layer as a layer of substantially uniform thickness, which thickness is equal to the thickness of sheet material from which the stampings are to be made. The third layer is subsequently electrodeposited upon this intermediate layer of metal. Thus, the proper shape and thickness desired between the complementary molds or dies can be accurately reproduced. When the molds or dies are intended for forming molded articles the intermediate layer may be formed of any suitable material and of any shape, thickness and design desired before the third layer is electroformed thereon. In this way the dimensions of all of the parts of the intermediate layer can be easily and exactly controlled prior to the electrodeposition of the third layer, and accordingly the space between the first and third layers which subsequently results when the intermediate layer is removed can also be accurately formed.

My invention also contemplates forming complementary mold or die members from a finished article or stamping. In such case instead of forming a separate member to act as a pattern for forming the complementary molds or dies, a finished article may be employed as a preformed intermediate layer and the first layer electroformed directly thereon. After this has taken place, the third layer is deposited upon or about the opposite side of the preformed intermediate layer and the first layer as a separate third layer. Subsequently when the three layers are separated and the intermediate layer removed, the third layer may be combined with the first layer in forming complementary mold sections. The intermediate layer can be subsequently and repeatedly used for the formation of additional complementary dies and molds of like construction and design.

Among the objects of my invention is to provide a means for making stampings or forming articles in which the punch and die or mold portions are shaped in spaced complementary relations and in which the process provides a faithful reproduction of an original pattern by a method which is efficient and economical. These and other objects and advantages will appear more fully in the following detailed description considered in connection with the accompanying drawings, in which.

Figure 1:
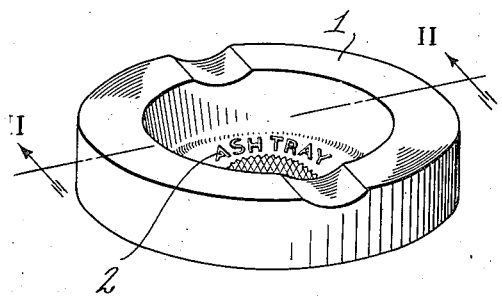
Fig. 1 is a perspective view of a pattern from which a punch or die is formed.
Figure 2:
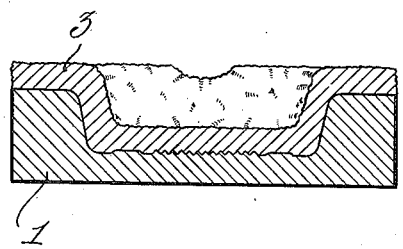
Fig. 2 is a transverse view in cross section of the pattern taken along lines II—II of Fig. 1 and showing a layer of metal deposited on the pattern.
Figure 3:
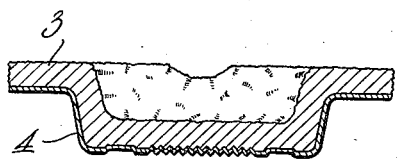
Fig. 3 is a transverse view in cross section of the punch portion of the die with a spacing layer of metal deposited thereon.

Referring to the drawings, I show an embodiment of my invention illustrating the various steps required to form an article or stamping such as an ash tray. In Fig. 1 the reference number 1 indicates the original pattern of an ash tray from which the dies are made. The ash tray may include intricate designs or letters 2.

The pattern 1 may be formed of any material capable of maintaining a substantially rigid shape, that is, the pattern may be made from metal, wood, rubber, or other plastic material. From the pattern, as illustrated in Fig. 1, the first step in the process of making stampings therefrom is to form the upper die or punch. The surface of the pattern to which the punch is to conform is coated with a graphite paint or a copper dust paint for the purpose of providing an electrically conductive surface on the pattern. Besides functioning as an electrically conductive medium, the graphite or copper dust paint also functions as a means for preventing too strong an adhesion between the pattern and the metal which is electrodeposited thereon.

When the pattern is thus prepared, it is immersed in a bath and by an electrodepositing operation a layer of metal 3 is deposited on to the pattern. Any type of conventional plating or electrodeposition process may be employed for producing the layer of metal 3 on the pattern 1.

In the embodiment as described for the manufacture of ash tray stampings, I find that good results can be obtained by allowing the pattern to remain in the electrode-position bath until the thickness of metal deposited thereon measures approximately one-fourth inch. While various metals or combinations thereof may be deposited on to the pattern 1 to form the punch 3, I prefer to form the punch member from electrodeposited iron. When the proper thickness of iron is formed on the pattern 1 the electrodeposition process is discontinued and the pattern 1 is separated from the punch 3. As above stated, the presence of the graphite or copper dust paint on the surface of the pattern facilitates separation.

The surface of the punch 3 which carries the design from the pattern is cleaned and is coated with a conductive medium such as graphite paint; thereafter the punch 3 is subjected to an electrodeposition process in which a thin layer of metal 4 is deposited on that surface of the punch which carries the configuration of the pattern. It is to be understood that if desired, that surface of the punch which is opposite the configuration may be treated to prevent further deposition thereon by application of an insulating coating such as a non-conducting lacquer.

It is intended that the thickness of the layer of metal 4 which is deposited on the punch 3 should be substantially equal to the thickness of the metal from which the stampings are to be formed. In the formation of the electrodeposited layer 4 it has been found that a substantially uniform thickness can be obtained, and that all of the detail of the configuration or design appearing on the surface of the punch is accurately reproduced in complementary dimensions at the outer surface of the layer of metal 4. This detail on the outer surface of the layer 4 appears to remain accurate on intricate designs, even though the thickness of the layer 4 attains a measurement of about one-sixteenth inch. This intermediate or spacer layer of metal 4 is preferably formed of iron, although other metals or combinations thereof may be substituted therefor.

Figure 4:
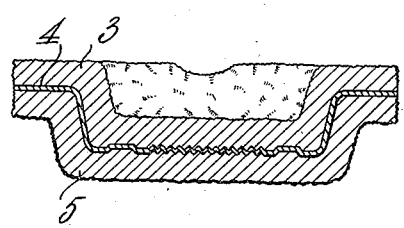
Fig. 4 is a transverse view in cross section of a portion of the punch and spacing layers, with a lower die portion deposited on the spacing layer.

When the intermediate layer 4 has attained a proper thickness, it is removed with the punch 3 from the depositing bath, and the outer or exposed surface of the layer 4 is coated with a conductive medium such as graphite paint, and the assembly is again placed in a deposition bath where a die portion 5 (Fig. 4) is deposited on to the intermediate layer 4. The die portion 5, similar to the punch portion 3 is formed of electrodeposited iron and preferably has a thickness of about one-fourth inch. Upon completion of the depositing operation the assembly is removed from the bath and the intermediate layer 4 is removed from both the punch 3 and die 5. The intermediate layer 4 may be discarded.

If the stampings are to be formed from thin sheet material such as paper or the like, the intermediate layer 4 may be omitted in the process and the die portion 5 may be electroformed directly upon the graphited surface of the punch 3.

My invention also contemplates the shaping or formation of the intermediate layer 4 by means other than electrodeposition. For example, a soft metal sheet may be employed as the intermediate layer and its shaping may be effected by pressure of the punch against the sheet of soft metal supported by a suitable backing. Besides the soft metal, the intermediate layer may be formed of a shapable plastic material capable of retaining its shape in a substantially rigid manner.

Figure 5:
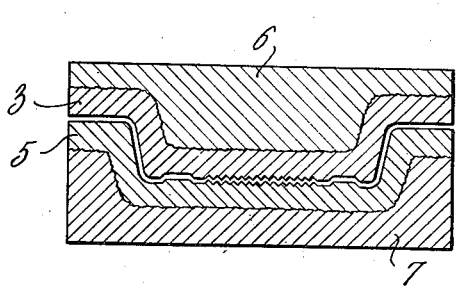
Fig. 5 is a transverse view in cross section of a completed punch and die assembly reinforced with a metal backing and with the spacing layer removed.

As shown in Fig. 5, the punch portion 3 and the die portion 5 may be reinforced or backed with supporting metals 6 and 7 respectively. These backing metals may be cast in place, sprayed against the members by an atomized thermodeposition, or the backs of the punch and die may be machined and fitted to complementary reinforcing members.

Before or after the backing metals 6 and 7 are applied to the punch and die portions, either or both the punch and die members may be subjected to a hardening process for increasing the durability of these members.

Figure 6:
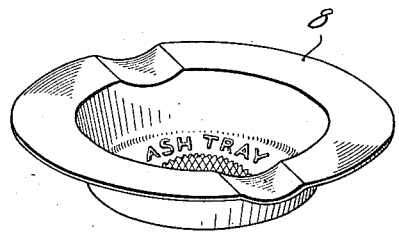
Fig. 6 is a perspective view of a stamping formed by the punch and die assembly.

Fig. 6 illustrates a stamping 8 which may be produced by the punch 3 and die 5. While the stamping has been illustrated in the form of an ash tray, it is to be understood that such is shown only by way of illustration and is not intended as limitive of the invention; the invention being equally applicable to various other articles requiring impressions on or shaping of sheet metal.

Figure 7:
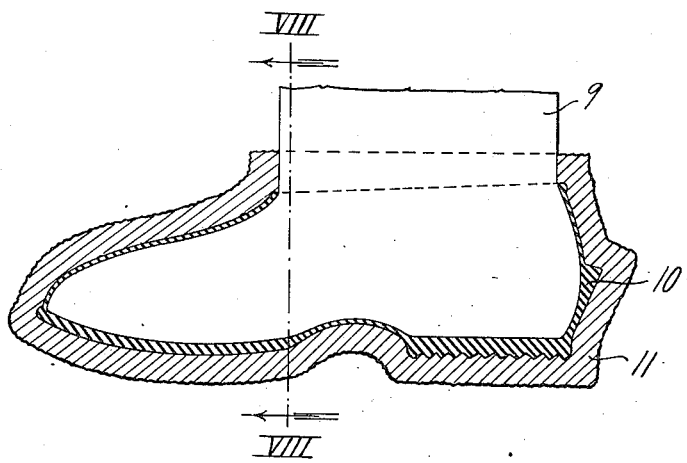
Fig. 7 is an elevational view, partly in cross section, showing a modified form of my invention wherein complementary mold sections enclose a spacing layer of non-uniform thickness; and, Fig. 8 is an elevational cross sectional view taken upon section line VIII—VIII of Fig. 7, but having the spacing layer removed therefrom.
Figure 8:
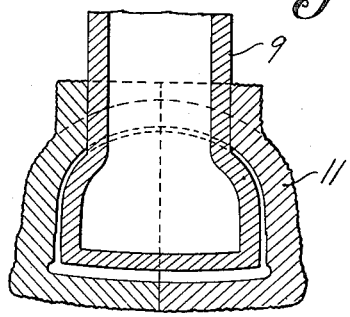

In Figs. 7 and 8, I have shown a pair of complementary mold sections for illustrating generally a modified form of my invention. In this embodiment a first member or form 9, which is preferably of metal and which may be of any desired predetermined size, shape and design, is supplied to serve as one mold section. Upon this member 9 is formed an intermediate spacing member 10 of any suitable material and given the exact dimensions and design desired in the finished article to be subsequently formed by the pair of complementary mold sections.

After the layer 10 has been formed the outer exposed surfaces of the form 9 and the spacing layer 10 are coated with an electrically conductive medium such as graphite paint, or the like, so that a third outer layer 11 may be electroformed thereon and so that a too strong adhesion will not result between the outer layer and the surfaces upon which it is deposited. The form 9 and the spacing layer 10 thus prepared are immersed in an electrolytic bath and the outer layer 11 is electrodeposited thereon.

When the proper thickness of metal has been attained in the layer 11 the assembly is removed from the electrolyte; the outer layer is divided or cut along a suitable longitudinal vertical plane so that the two halves thereof may be readily removed; and the spacing layer 10 is removed from the form 9. Should any metal be removed from the outer layer when this layer is divided this metal may be readily replaced in any well known manner so that these two halves will fit properly together and have their respective pattern faces correctly spaced relative to each other. It will be seen that when the halves of the outer layer 11 are again replaced about the form 9 a space will be formed therebetween which will have the exact dimensions of the separating layer and which may be subsequently used for forming molded articles. Complementary mold sections made in accordance with this method may be readily used for accurately forming articles having irregularly shaped portions, thin wall portions, accurately dimensioned portions or intricately designed portions in a quick, accurate and efficient manner.

Should it be desired to make a large number of such complementary mold sections, it would only be necessary to successively form the desired number of electrodeposited layers 11 upon the intermediate layer 10 before removing the intermediate layer 10 from the form 9. After this has been accomplished the spacing layer 10 may be cut along a longitudinal vertical plane and removed from the form 9 in such a way as not to destroy its desired shape. The halves of the spacing layer can then be brought together and have the halves of the outer layer fitted about the spacing layer. At such a time these parts can be secured in a relatively fixed relationship. After this has been accomplished the inner surface of the layer 10 can be coated with a graphite medium and the outer surface of the layer 11 lacquered and the assembled parts then placed in an electrolytic bath and an inner form or core electrodeposited thereupon as a substantial duplicate of the form 9. This series of steps can be repeated until the desired number of duplicate forms or cores has been produced.

It will be obvious that if the spacing layer 10 is made of rubber composition, as might well be the case in the assembled parts shown in Fig. 7, this layer might be made sufficiently yieldable so as to be removable from the form 9 as a single member. In such a case the single layer can be used during the formation of a great number of subsequently formed similar mold sections.

From the foregoing description it is believed obvious that I have produced a novel and unique method of forming complementary mold sections, dies or punch and die combinations in which differentials in surface dimensions of complementary pairs of members are automatically attained by an expeditious and economical process.

While I have shown and described preferred embodiments of my invention, it is to be understood that the invention is susceptible of those modifications that appear within the intent and scope of the appended claims.

Having thus described my invention, what I claim and desire to protect by Letters Patent is:

1. The method of forming a punch and die from a pattern comprising the steps of electroforming a layer of metal upon the pattern, removing the layer from the pattern, electroforming a second layer of metal upon the pattern face of the first named layer, electroforming a third layer of metal upon the exposed face of the second layer, and removing the first and third layers from engagement with the second layer.

2. The method of forming a punch and die from a pattern comprising the steps of electroforming a layer of metal upon the pattern, removing the layer from the pattern, electroforming a second layer of metal upon that face of the first named layer which has been formed on the pattern, removing the second layer from the first named layer, electroforming a third layer of metal upon the other face of the second layer, and removing the second layer from the third layer.

3. The method of forming a die from a punch comprising the steps of electroforming a layer of metal on the punch, electroforming a second layer of metal upon the first named layer, while still upon the punch, and removing both of said layers from the punch and from each other.

4. The method of forming a punch and die from a pattern comprising the steps of electroforming a layer of metal upon the pattern, removing the layer from the pattern, electroforming a second layer of metal upon the pattern face of the first named layer, removing the second layer from the first named layer, electroforming a third layer of metal upon the opposite face of the second layer, removing the second layer from the third layer, and reinforcing the backs of the first and third deposited layers of metal with a supporting metal.

5. The method of forming a punch and die from a pattern comprising the steps of electroforming a layer of iron upon the pattern, removing the layer from the pattern, electroforming a layer of metal upon the pattern face of the first named layer, electroforming a layer of iron on the back of the deposited layer of metal, and removing the layer of metal from the assembled layers, whereby the first-named iron layer is constituted one member of the punch and die when said layer of metal has been so removed, and the second-named iron layer from which said layer of metal has been removed, is constituted the complemental member of the punch and die.

6. The method of making complementary dies from a pattern comprising the steps of applying a coating of electrically conductive material to said pattern, electrodepositing a layer of metal upon the coated pattern, removing the layer from the pattern, applying a coating of electrically conductive material to the pattern face of said layer, electrodepositing a second layer of metal directly upon the coated pattern face of the first layer, applying a coating of electrically conductive material to the exposed face of the second layer, electrodepositing a third layer of metal directly upon the coated exposed face of the second layer, and removing the second layer from the first and third layers whereby complementary dies are formed by said first and third layers.

ARTHUR W. BULL.